United States Patent
Azriel et al.

(10) Patent No.: US 10,382,566 B2
(45) Date of Patent: Aug. 13, 2019

(54) BUSINESS SERVICE DISCOVERY

(71) Applicant: ENTIT SOFTWARE LLC, Sanford, NC (US)

(72) Inventors: David Azriel, Risho Le-Zion (IL); Emil Shmul, Yehud (IL); Haya Axelrod, Petach Tikva (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 369 days.

(21) Appl. No.: 14/688,566

(22) Filed: Apr. 16, 2015

(65) Prior Publication Data

US 2016/0308712 A1  Oct. 20, 2016

(51) Int. Cl.
*H04L 12/24* (2006.01)
*H04L 29/08* (2006.01)

(52) U.S. Cl.
CPC .......... *H04L 67/16* (2013.01); *H04L 41/5058* (2013.01); *H04L 41/12* (2013.01)

(58) Field of Classification Search
CPC .. H04L 67/16; H04L 41/0213; H04L 41/5058
USPC ................................................. 709/220, 238
See application file for complete search history.

(56) References Cited

U.S. PATENT DOCUMENTS

| | | | |
|---|---|---|---|
| 6,304,556 B1 | 10/2001 | Haas | |
| 7,742,436 B2 | 6/2010 | Carrillo et al. | |
| 8,321,549 B2 | 11/2012 | Isobe et al. | |
| 8,381,167 B2 | 2/2013 | Shmul | |
| 8,775,499 B2 | 7/2014 | Nagarajrao et al. | |
| 8,825,901 B2 | 9/2014 | Joukov | |
| 2002/0091857 A1* | 7/2002 | Conrad | H04L 41/0213 709/238 |
| 2006/0087985 A1* | 4/2006 | Kakivaya | H04L 12/42 370/254 |
| 2006/0171332 A1* | 8/2006 | Barnum | H04W 8/005 370/254 |
| 2010/0191555 A1* | 7/2010 | Shmul | G06Q 10/06 717/104 |
| 2011/0295841 A1* | 12/2011 | Sityon | G06F 17/30958 707/722 |

(Continued)

OTHER PUBLICATIONS

Scott D. Lowe, SCCM 2012 Client Deployment (Part 2), Feb. 27, 2013, TechGenix, http://techgenix.com/sccm-2012-client-deployment-part2/.*

(Continued)

*Primary Examiner* — David R Lazaro
*Assistant Examiner* — Zi Ye

(57) ABSTRACT

A non-transitory machine-readable storage medium is described in which discovery job instructions initiate a discovery job to discover target configuration items associated with a target business service in an information technology infrastructure. The storage medium comprises scoping instructions to, for a first configuration item and in response to a first stop condition not existing, designate the first configuration item as one of the target configuration items and continue the discovery job from the first configuration item to a second configuration item; and for the second configuration item and in response to the first stop condition or a second stop condition existing, stop the discovery job from proceeding from the second configuration item to a third configuration item.

20 Claims, 7 Drawing Sheets

(56) References Cited

U.S. PATENT DOCUMENTS

2013/0227336 A1  8/2013  Agarwal et al.
2014/0022275 A1* 1/2014  Muthu .................... H04L 41/22
                                                          345/619

OTHER PUBLICATIONS

Haziri, F., "Design of a CMDB with Integrated Knowledge Management Based on Topic Maps," Masters Thesis, University of Oslo, Department of Informatics, May 21, 2009, 90 pages.
"Planning for Discovery in Configuration Manager," Microsoft System Center Webpage, https://technet.microsoft.com/en-in/library/gg712308.aspx, Jan. 1, 2013, 11 pages.

* cited by examiner

MACHINE-READABLE STORAGE MEDIUM 500

Discovery job instructions to:

Initiate a discovery job to discover target CIs associated with a target business service in an information technology infrastructure comprising a plurality of CIs 504;

Initiate another discovery job to discover the target CIs associated with the target business service 520

Scoping Instructions To:

For a first CI of the plurality of CIs, in response to a first stop condition not existing, designate the first CI as one of the target CIs and continue the discovery job from the first CI to a second CI of the plurality of CIs 508;

For the second CI of the plurality of CIs, in response to the first stop condition or a second stop condition existing, stop the discovery job from proceeding from the second CI to a third CI of the plurality of CIs 512;

Wherein the second stop condition is a hop stop condition, for the second CI: calculate a number of hops from the second CI to a starting CI of the plurality of CIs; and determine that the hop stop condition exists when the number of hops is greater than a hop index 516;

Determine a shortest path of a plurality of paths from a fourth CI to the starting CI, where the shortest path has a number of hops that is less than or equal to the hop index; and, in response, designate the fourth CI as one of the target CIs and continue the discovery job from the fourth CI to a fifth CI 524;

Receive the hop index via user input 528;

Wherein a fourth CI is a direct successor of an upstream CI, and an edge between the upstream CI and the fourth CI represents a relationship: apply a border rule to the relationship between the fourth CI and the upstream CI to determine that the relationship is external and not internal; and in response, determine that a border stop condition exists and disassociate the fourth CI from the target business service 532;

The fourth CI may be associated with another business service that is different from the target business service 536;

Receive the border rule via user input 540;

FIG. 5A

MACHINE-READABLE STORAGE MEDIUM 500

Scoping Instructions To:

Receive a notification that one of the target CIs has been disassociated from the target business service; in response, identify a related target CI that is associated with the disassociated target CI; and disassociate the related target CI from the target business service 544;

Identify the related target CI by determining that the related target CI is not a direct successor of an upstream target CI that is associated with the target business service 548;

FIG. 5B

BUSINESS SERVICE DISCOVERY

BACKGROUND

To discover and model a business service in a network environment, some discovery solutions either discover the entire network or all of the nodes and configuration items within a given IP range. When using a given IP range, for example, these solutions may return all of the configuration items within the range. To model a target business service, the administrator may then determine which configuration items are used by the targeted service.

BRIEF DESCRIPTION OF THE DRAWINGS

FIGS. 5A and 5B are a block diagram of a non-transitory machine-readable storage medium containing discovery job instructions and scoping instructions according to an example of the present disclosure.

DETAILED DESCRIPTION

Figure 1:
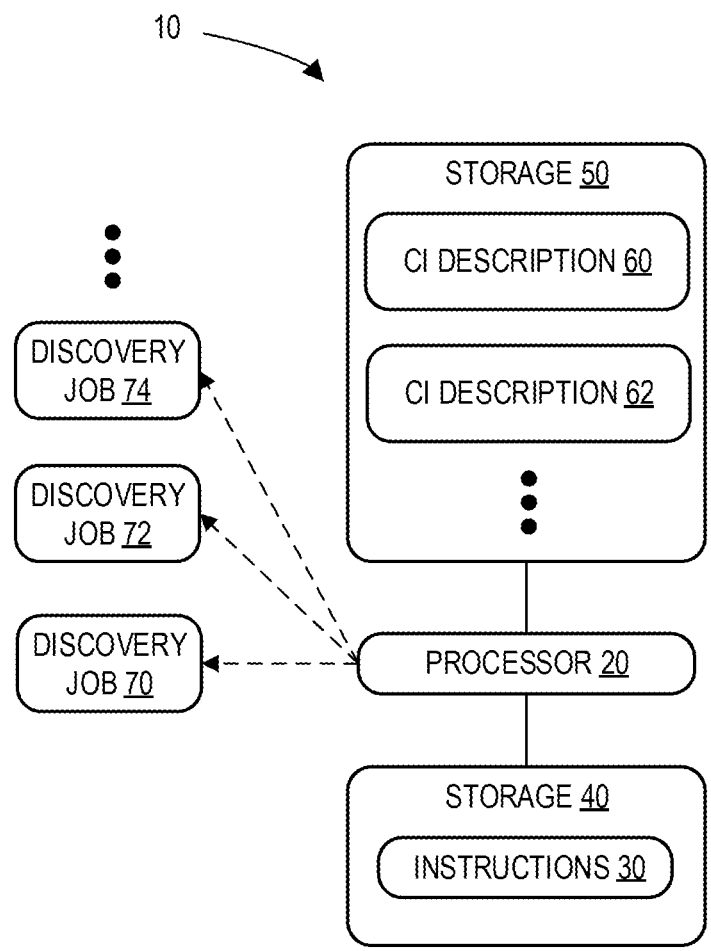
FIG. 1 is a block diagram of a system for initiating discovery jobs to discover target configuration items according to an example of the present disclosure.

The complexity of information technology (IT) infrastructures utilized by enterprises and other organizations continues to grow with new developments in technology, the increasing globalization of commerce and other drivers. Current data centers may host hundreds or thousands of software applications that realize hundreds or thousands of business services that are consumed by external customers and/or internal customers, such as employees of an organization. As a data center or other IT infrastructure expands, it may become more difficult to discover and model particular components, such as a specific business service.

In an example IT infrastructure, models of the infrastructure, its individual business services and their relationships with the infrastructure may be stored in repositories. An example of such a repository is a configuration management database (CMDB). Information about nodes such as configuration items (CIs) within an infrastructure may be recorded in a configuration record within a CMDB. Each configuration record may document the lifecycle of a single CI, with some CIs comprising many constituent components. As described in more detail below, the CIs and their relationships may be displayed as a graph (such as a directed graph or similar construct), which may help an administrator visualize and comprehend the related business service.

To effectively manage a business service, an administrator may utilize automatic or semi-automatic discovery processes. Such discovery processes may access CMDBs to enable an administrator to discover configuration items on the network, along with relevant data regarding those items, such as the item's functionality, characteristics, attributes and its relationships to other configuration items. Discovery processes may also enable discovery of the topological properties of a network for a variety of purposes, such as to implement improvements to the organization's operations.

In some examples a discovery process may start at a given node of a network and discover CIs related to that node within an IP range. For each discovered CI the process may be repeated to discover additional CIs. At the end of the process, the entire network within the IP range, including all business services contained therein, will be discovered and stored in the CMDB. Such a process may be referred to as a "top-down" discovery process.

However, such a top-down discovery process within an IP range often returns a significant quantity of information unrelated to the targeted business service. To model the target business service, the administrator may then devote significant time and resources to determining which of the many configuration items are used by the targeted service. Accordingly, such a process may be ill-suited for discovering a specific business service, particularly within a large IT infrastructure comprising numerous business services and other items.

Further, errors and/or warnings returned by such a process are not associated with a particular business service, making it difficult or impossible to know whether they relate to the target business service. For example, a particular discovery request may lack permissions or credentials necessary to invoke a server API and extract information from the server. In such a situation, the discovery administrator may troubleshoot the error by, for example, contacting the owner of the server and requesting that appropriate permissions are added. Where the discovery results capture numerous configuration items unrelated to the target business service, some of the errors or warnings may be unrelated to the target business service. However, in some examples the discovery administrator may not be able to determine if an error or warning is related to the target business service. In these situations, determining whether a targeted business service has been completely discovered can prove challenging.

The present disclosure describes examples of a system, method and non-transitory machine-readable storage media for discovering target configuration items associated with a target business service. As described in more detail below, in some examples a discovery job may be initiated to discover target configuration items associated with a target business service in an information technology infrastructure comprising a plurality of configuration items. For a first configuration item, in response to a first stop condition not existing, the first configuration item may be designated as one of the target configuration items and the discovery job may be continued from the first configuration item to a second configuration item of the plurality of configuration items. For a second configuration item, in response to the existence of the first stop condition or a second stop condition, the discovery job may be stopped from proceeding from the second configuration item to a third configuration item of the plurality of configuration items.

While examples of discovery processes are discussed herein, those skilled in the art will appreciate that the present disclosure may be utilized with any suitable discovery process and for a variety purposes in addition to modeling and configuration management of business services.

This disclosure includes definitions of selected terms. The definitions include various examples and/or types of components that may be used for implementing examples of the disclosure. These examples are not intended to be limiting. Both singular and plural forms of terms may be within the definitions.

"Business service", as used herein, may refer to a collection of processes, tasks, and/or activities that are executed via an IT infrastructure to manage and/or produce a service or product.

"Configuration management database (CMDB)", as used herein, may refer to a database used to manage configuration records throughout the lifecycle of the configuration item(s) associated with the configuration record. The CMDB records the attributes of each CI and relationships with other CIs. A CMDB may also contain other information linked to CIs, such as incidents, problems or change records.

"Configuration item (CI)", as used herein, may refer to any component of an IT infrastructure that needs to be managed in order to deliver an IT service, such as a business service. Non-limiting examples of CIs include hardware elements, software, buildings, personnel, and documentation, such as process documentation and service level agreements.

"Database", as used herein, may refer to a physical and/or logical entity that can store data. A database may be, for example, a table, a file, a list, a queue, a memory, a register, and so on. In different examples, a database may reside in one logical and/or physical entity and/or may be distributed between two or more logical and/or physical entities.

"Discovery job", as used herein, may refer to a process that discovers CIs within an IT infrastructure and collects information regarding those CIs.

"Information technology (IT) infrastructure", as used herein, may refer to a combined set of hardware, software, networks, facilities, etc., utilized to develop, test, deliver, monitor, control and/or support IT services. Non-limiting examples of IT infrastructure components include servers, printers, routers, data centers, databases, disk drives, application programs, file utilities, facilities, and the like. Such components may be accessible locally and/or over a network.

FIG. 1 shows block diagram of a system 10 for initiating discovery jobs to discover target configuration items according to an example of the present disclosure. As described in more detail below, the system 10 may include a processor 20 that executes instructions 30 for discovering target configuration items associated with a target business service. In the example of FIG. 1, the instructions 30 may be stored in a storage 40 that is communicatively coupled to processor 20.

The processor 20 may include at least one physical device configured to execute at least one instruction. For example, the processor 20 may be configured to execute instructions that are stored on a non-transitory machine-readable storage medium. Such instructions may be part of at least one application, service, program, routine, library, object, component, data structure, or other logical construct. Such instructions may be implemented to perform a task, implement a data type, transform the state of at least one device, or otherwise arrive at a desired result.

Storage 40 may store instructions 30 executable by the processor 20. As described in more detail below, in some examples storage 40 may include non-transitory machine-readable storage media such as removable media and/or built-in devices, optical memory devices such as CD, DVD, HD-DVD, Blu-Ray Disc, and the like, semiconductor memory devices such as RAM, EPROM, EEPROM, and the like, and/or magnetic memory devices such as hard disk drive, floppy disk drive, tape drive, MRAM, and the like, among others. Storage 40 may include memory devices with at least one of the following characteristics: volatile, non-volatile, dynamic, static, read/write, read-only, random access, sequential access, location addressable, file addressable, and content addressable.

In some examples, the processor 20 and storage 40 may be components of at least one computing device. In different examples, such computing device may take the form of a server, network computing device, desktop computing device, and/or other suitable type of computing device.

The system 10 may also comprise a storage 50 that is communicatively coupled to processor 20. Storage 50 may store descriptions of a plurality of configuration items (CIs) that comprise an IT infrastructure. While the example of FIG. 1 shows two CI descriptions 60 and 62, it will be appreciated that storage 50 may store significantly more CI descriptions, numbering in the hundreds, thousands, millions, or any suitable number. As discussed above, some of these CIs may be associated with a target business service among a plurality of business services in the IT infrastructure. Others of the CIs may not be associated with the target business service, but instead with other business services of the IT infrastructure. Each of the CI descriptions may comprise characteristics, conditions and/or attributes of the corresponding CI or node, such as the communications protocol used at that node, the operating system invoked at that node, classes that are relevant to that node, etc.

In some examples, the storage 50 may comprise a CMDB. The CMDB may house CI data and other configuration data for all of the IT equipment of a data center, including but not limited to servers, software running on servers, applications realized by the software, and business services that are realized by the applications. In some examples, the storage 40 and storage 50 may be combined into a single storage component.

The processor 20 may execute instructions 30 to initiate discovery jobs to discover target configuration items associated with the target business service. While the example of FIG. 1 shows three discovery jobs 70, 72 and 74, it will be appreciated that the processor 20 may initiate fewer or significantly more discovery jobs. Each discovery job may discover different types of IT infrastructure components of a business service. For example, a business service may utilize databases, web servers, application servers, etc. These databases and servers may be produced by or associated with a variety of different vendors. For example, for two different web servers provided by two different vendors, two different discovery jobs may be utilized to discover the different web servers. In other examples, a Linux devices discovery job may discover Linux devices, and corresponding Linux exploration discovery jobs may collect and return device information for those devices running Linux operating systems, such as servers, network routers, switches, printers, etc.

In some examples, each discovery job may comprise triggering queries that may determine which CIs may be target CIs for this discovery job. A query may comprise a semantic construction that facilitates gathering and processing information. A query may be formulated in a database query language, an object query language, a natural language, or any other suitable language. For example, a triggering query may be formulated in topology query language (TQL) that determines which CIs may be target CIs for the corresponding discovery job. TQL refers to an object-oriented framework for describing applications and business services, and includes both physical and logical objects, their attributes, and their relationships to one another. TQL may enable the creation of graphical views designed to capture relevant interdependencies (i.e., relationships) of items (including CIs) across IT services, applications and infrastructure groups.

Correspondingly, each target CI may execute different discovery jobs. For example, a node that is a target CI may trigger discovery on its own information and configuration (such as disks, CPUs, etc.), or it may trigger TCP Connection discovery to discover adjacent nodes.

Figure 2:
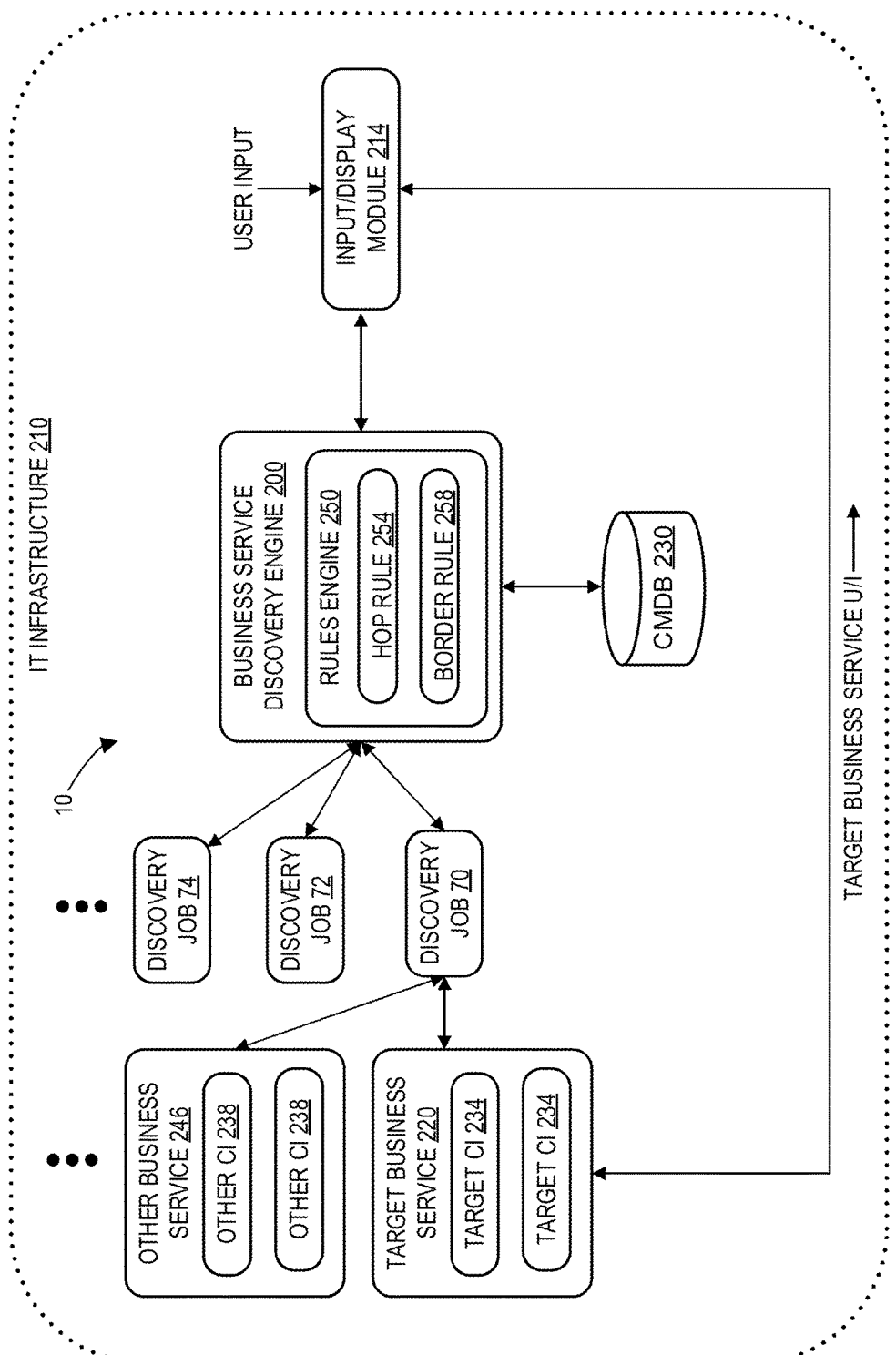
FIG. 2 is a block diagram illustrating an example business service discovery engine and discovery job flow in an IT infrastructure according to an example of the present disclosure.

Turning now to FIG. 2, a block diagram illustrating one example of a system 10 comprising an example business service discovery engine 200 and showing discovery job flow in an IT infrastructure 210 according to an example of the present disclosure is provided. In some examples, the business service discovery engine may be a component of at least one computing device. In some examples, the business discovery engine 200 may comprise the processor 20 and storage 40 of FIG. 1. In this example, the system 10 may include an input/display module 214 that may receive user input comprising, for example, a request to discover a target business service 220. The input/display module 214 may be communicatively coupled to the business service discovery engine 200, and may provide input that directs the engine to discover the business service structure (e.g., topology) of target business service 220.

As described in more detail below, the business service topology may be stored in CMDB 230 as a graph, such as a directed graph or other data structure. In some examples, the input/display module 214 may be communicatively coupled to the target business service 220 via, for example, a network, to enable a user to provide user input to the target business service and interact with the service via a target business service U/I displayed to the user via the input/display module.

In response to input from the user input/display module 214, or in response to internal programmatic instruction, the business service discovery engine 200 initiates discovery jobs 70, 72, 74 to discover CIs within the IT infrastructure 210. As described in more detail below, using information from such discovery jobs, the business service discovery engine 200 may distinguish target CIs 234 associated with the target business service 220 from other CIs 238 associated with another business service 246. While the example of FIG. 2 shows two target CIs 234 in the target business service 220 and two other CIs 238 in the other business service 246, it will be appreciated that the target business service and the other business service may comprise significantly more CIs. The results of this discovery process may be formulated into a data structure that represents the business service, and which can be stored in the CMDB 230 and displayed to a user, such as via a directed graph.

In some examples, the business service discovery engine 200 may utilize rules and corresponding stop conditions to determine if a discovered CI is a target Ci associated with a target business service. In the example of FIG. 2, the business service discovery engine 200 may include a rules engine 250 that may execute rules corresponding to stop conditions.

Figure 3:
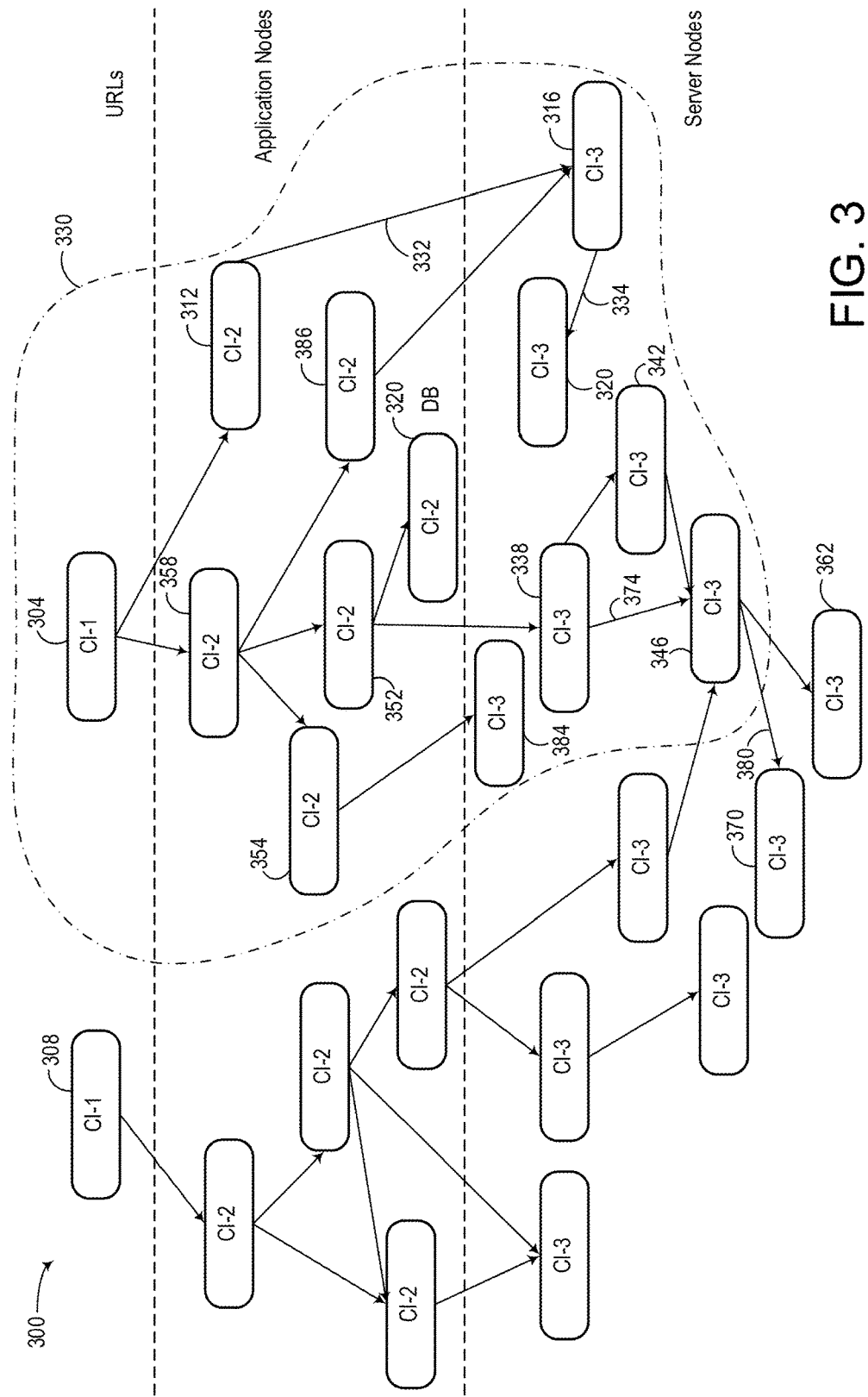
FIG. 3 is an illustration of a directed graph of configuration items among which the system of FIG. 2 may discover target configuration items according to an example of the present disclosure.

In one example, the rules engine 250 may comprise a hop rule 254. With reference now to FIG. 3 and as described in more detail below, an example of hop rule 254 will be described in the context of a directed graph 300 that comprises a plurality of CIs, including target CIs associated with the target business service and other CIs that are not associated with the target business service.

In some examples, a topological query from a discovery job may be executed using the directed graph 300. In some examples, the system 10 may utilize the directed graph 300 to discover target CIs among the plurality of CIs. It will be appreciated that directed graph 300 may represent an entire IT infrastructure or a portion of such infrastructure that may be discovered by the system 10. It will also be appreciated that in the context of directed graph 300, each CI may be referred to as a node of the directed graph. In some examples, the directed graph 300 may be stored in the CMDB 230 of FIG. 2.

In the example of FIG. 3, the directed graph 300 includes CIs in the form of a target business service URL 304 and another business service URL 308. In some examples, the target business service URL 304 may correspond to a starting CI that represents an entry point to the target business service. In these examples, where a user desires to discover target CIs associated with the target business service, user input may be received that includes the target business service URL 304 as a starting CI. A URL resolver in the business service discovery engine 200 may resolve the URL 304 and report to the CMDB 230 the IP address and port of the target business service identified by the resolved URL 304. Expressed in another manner, the target business service URL 304 may be a pointer to the starting CI associated with the target business service.

With continued reference to the example of FIG. 3, the directed graph 300 may include CIs in the form of application nodes CI-2 that correspond to various applications comprising software. Such application software may be executed by an application server. Examples of applications that may be utilized by a business service include online shopping applications, financial transaction applications, enterprise content management applications, data mining applications, etc. In some examples, application nodes CI-2 may represent applications and/or computing devices on which the applications are operating. In some examples, various aspects of a business service may be provided by a collection of such application nodes CI-2.

The directed graph 300 may further include CIs in the form of server nodes CI-3 corresponding to various servers, such as a web server node 338 and an application server node 316. As noted above, an application corresponding to an application node CI-2 may comprise software that is executed by an application server of a server node CI-3. It will be appreciated that in some examples directed graph 300 may include other types of server nodes, such as database server nodes, file server nodes, gaming server nodes, print server nodes, etc.

In the example of FIG. 3, the topology of the target business service is indicated by the boundary 330 that defines a collection of CIs, including URL 304, application nodes CI-2, and server nodes CI-3. It will also be appreciated that the above examples, describing components that the various nodes may represent, are chosen merely for example purposes, and that other examples and/or organizational schema may be represented in a directed graph. Additionally, in some examples a node in an IT infrastructure graph may not necessarily be tied to a specific tangible item and may, for example, facilitate illustrating relationships between an IT infrastructure and a corporate structure.

The directed graph 300 also indicates relationships between the CIs shown in the IT infrastructure. In the example of FIG. 3, the directed edges between two CIs in the graph are represented by arrows and illustrate relationships between these nodes of the IT infrastructure. For example, a first edge 332 connecting an online shopping application node 312 to application server node 316 may indicate that an application server represented by application server node 316 is communicatively coupled to the online shopping application represented by application node 312. For example, an application server represented by the application server node 316 may execute software associated with the online shopping application node 312. A second edge 334 connecting the application server node 316 to a database server node 320 may indicate that the application server utilizes data from a database represented by the database server node.

In some examples, relationships in the topology represented by a directed graph may be binary in nature. That is, each relationship may link exactly two topologically managed CIs. Relationships of degree n may be modeled by representing the relationships themselves as topologically managed CIs, until a binary model is built to describe the degree n relationships. Using this approach, individual CIs that are part of a larger CI resource may be aggregated. An aggregated CI may assume the topological states of the individual CIs that comprise the aggregated CIs.

It will also be appreciated that in some examples, the directed graph 300 may represent a graph with which topological queries are designed to interact. Further, while a directed graph is shown in the example of FIG. 3, in some examples a graph using a different organization scheme may be used to represent an IT infrastructure.

As noted above and with reference again to FIG. 2, the rules engine 250 may comprise a hop rule 254. As described in more detail below, utilizing a hop rule may limit a discovery activity such that it discovers CIs only up to a predetermined distance, designated by a hop index, from a starting CI that is associated with the target business service. In this manner, the discovery activity may be limited to discovering target CIs that are associated with the target business service.

In some examples, the hop index may be received via user input to, for example, the input/display module 214 of system 10. For example, an administrator may know that the target business service extends a particular number of hops from the starting CI in the directed graph 300. In other examples, the administrator may make an educated guess as to the number of hops that the target business service extends from the starting CI.

In some examples and with reference to the hop rule 254, the rules engine 250 determines a distance in the directed graph 300 from a selected CI to a starting CI that is associated with the target business service. Such distance along with the hop index may be expressed as a number of hops from one CI to a connected CI in the directed graph 300. In some examples, a hop may be defined as moving from one tier in a directed graph to a next tier in the graph. In some examples, moving from one type of server, such as a web server, to another type of server, such as an application server, may constitute one hop. Similarly, moving from an application server to a database server may constitute another hop. In other examples, moving from an application node CI-2 to a server node CI-3 may constitute a hop.

Figure 4:
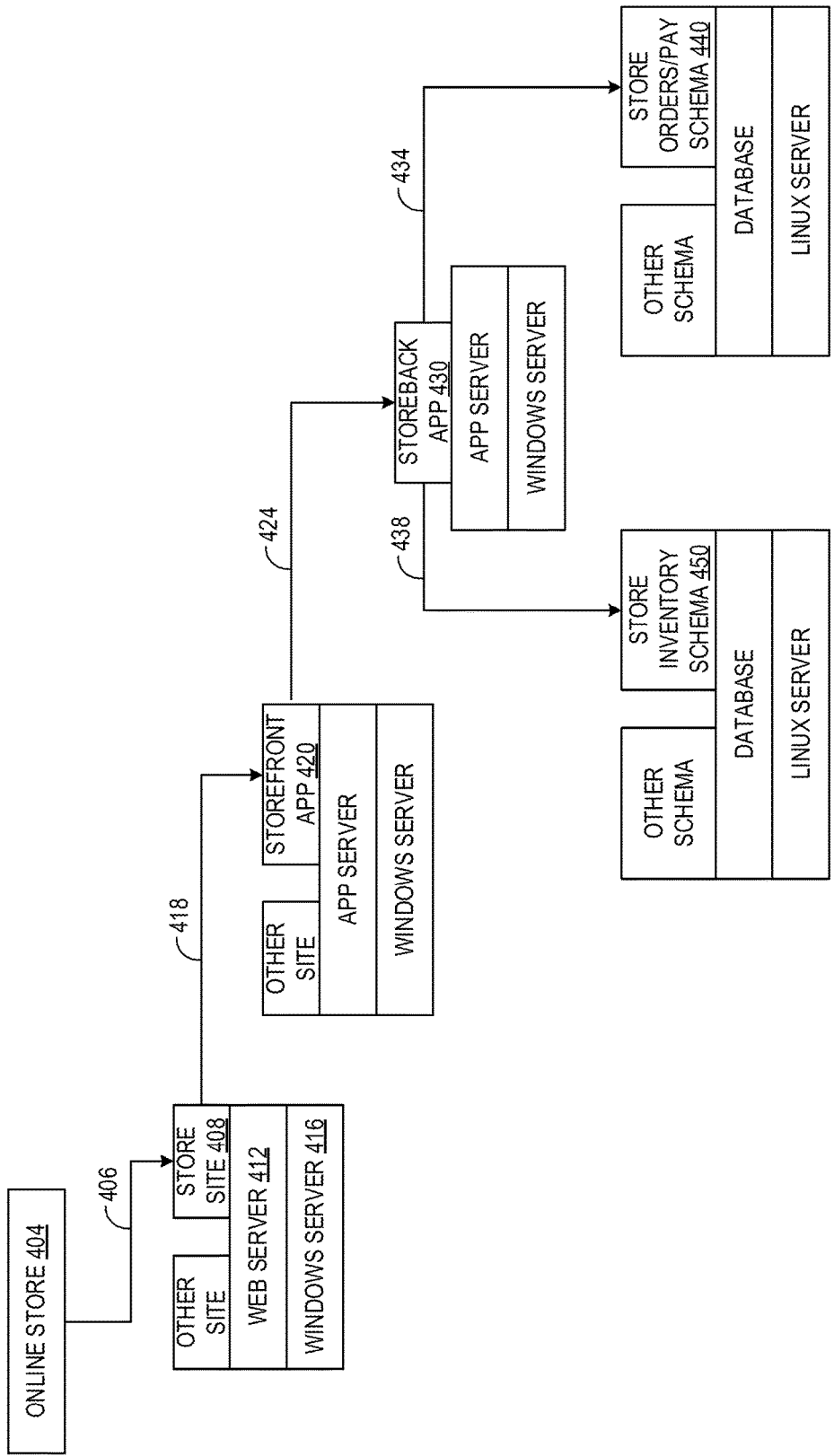
FIG. 4 is an illustration of a directed graph of configuration items among which the system of FIG. 2 may discover target configuration items according to an example of the present disclosure.

With reference now to FIG. 4 showing an example of a 4-tiered business service topology represented by a directed graph, in some examples a dependency between components may not constitute a hop. In the example of FIG. 4, a business service CI 404 may represent the name of the business service, such as Online Store in this example, and may maintain other information related to the business service, such as the owner of the service, the criticality of the service, and the like. The business service CI 404 is linked via edge 406 to a Store Site website component CI 408 which belongs to the Online Store business service. In this example the movement from the Online Store CI 404 to the Store Site website component CI 408 constitutes one hop.

In this example the Store Site website component CI 408 is linked to a web server component 412 that may comprise software that runs on another server, such as a Windows server component 416. Each of the dependencies between the Store Site website component CI 408 and web server component 412, and between the web server component 412 and Windows server component 416, may not constitute a hop.

The Store Site website component CI 408 is linked via edge 418 to a Storefront App application component CI 420. In this example the movement from the Store Site website component CI 408 to the Storefront App component CI 420 constitutes one hop. In this example the Storefront App component CI 420 is linked to an application server component that may comprise software that runs on another server, such as a Windows server component. As described above, each of the dependencies between the Storefront App component CI 420 and the application server component, and between the application server component and the Windows server component, may not constitute a hop.

The Storefront App component CI 420 is linked via edge 424 to another application component CI 430 labeled Storeback App in this example. In this example the movement from the Storefront App component CI 420 to the Storeback App component CI 430 constitutes one hop. The Storeback App component CI 430 is linked to an application server component that may comprise software that runs on another server, such as a Windows server component. Each of the dependencies between the Storeback App component CI 430 and the application server component, and between the application server component and the Windows server component, may not constitute a hop. In some examples, the Storefront App component CI 420 and the Storeback App component 430 may form at least a portion of an application tier.

In this example the Storeback App component CI 430 is linked via edge 434 to a schema component CI 440 that is labeled Store Orders/Pay Schema. In this example the movement from the Storeback App component CI 430 to the Store Orders/Pay Schema component CI 440 constitutes one hop. In this example the Store Orders/Pay Schema component CI 440 is linked to a database component that may comprise software that runs on another server, such as a Linux server component. Each of the dependencies between the Store Orders/Pay Schema component CI 440 and the database component, and between the database component and the Linux server component, may not constitute a hop.

In this example the Storeback App component CI 430 is also linked via edge 438 to another schema component CI 450 that is labeled Store Inventory Schema. In this example the movement from the Storeback App component CI 430 to the Store Inventory Schema component CI 450 constitutes one hop. In this example the Store Inventory Schema component CI 450 is linked to a database component that may comprise software that runs on another server, such as another Linux server component. Each of the dependencies between the Store Inventory Schema component CI 450 and the database component, and between the database component and the Linux server component, may not constitute a hop.

With reference again to FIG. 2 and in some examples, beginning with a set of discovery jobs that comprise a business service discovery flow, a subset of those discovery jobs may be designed to discover hops between CIs. These discovery jobs may be marked as discovery jobs that are capable of discovering hops. With these discovery jobs marked accordingly, the business service discovery engine 200 may determine which discovery jobs of the set of discovery jobs are designed to discover hops. In these examples, when such a discovery job reports a link or dependency between two CIs, the business service discovery engine 200 may determine that the discovery job reporting the link is marked as capable of discovering hops. Based on this determination, the business service discovery engine 200 may determine that the link is a hop. In these examples, each connected pair of CIs and its corresponding link discovered by this subset of jobs (and only this subset of jobs) will, when traversed, increase the hop count by one.

In some examples, other discovery jobs may not be capable of discovering hops. As these discovery jobs are incapable of discovering hops, the links or dependencies between or within CIs reported by these discovery jobs are determined to be links or dependencies other than hops. In one example and with reference again to FIG. 4, these discovery jobs may discover the dependency of database software running on a server, which is not considered a hop.

With reference again to FIG. 3, in one example a discovery job may proceed from starting CI URL 304 along a path to web server node 338. With reference to the path from URL 304 to server node 338 in the directed graph 300, each link between a direct predecessor node and a direct successor node may constitute a hop. In this example, there are 3 hops between URL 304 and the server node 338. If the hop rule 254 provides a hop index of 3 hops or less, then the rules engine 250 designates the server node 338 as a target CI associated with the target business service, and the rules engine 250 may direct the discovery job to proceed from the server node 338 to a direct successor server nod CI, such as node 320, node 342 and/or node 346.

In another example where the hop index is 2 hops or less and there are 3 hops between URL 304 and the server node 338, the rules engine 250 determines that a hop stop condition exists and stops the discovery job from proceeding from the server node CI 338 to any of its direct successor server node CIs, namely nodes 320, 342 and 346. Additionally, in this example the server node 338 may not be designated a target CI associated with the target business service.

In this manner, only CIs within the range of the hop index are determined to be target CIs associated with the target business service. Accordingly, the system 10 discovers and marks CIs associated with the target business service while correspondingly avoiding the discovery of other CIs that are not associated with the target business service. Additionally and where a hop stop condition exists, by stopping the discovery job from proceeding past the server node 338 to another CI, unnecessary discovery activities are avoided. Accordingly, the time required to discover the target business service is reduced, and the resources required for such discovery are correspondingly minimized.

In some examples, a selected CI may have more than one path to the starting CI in the directed graph 300. In these examples, the rules engine 250 may determine the shortest path of the plurality of paths from the selected CI to the starting CI. In one example, a discovery job may examine server node 346. As illustrated in directed graph 300, there are 2 possible paths from server node 346 to starting CI URL 304. A first path of node 346-node 342-node 338-node 352-node 358-node 304 traverses 5 hops. A second path of node 346-node 338-node 352-node 358-node 304 traverses 4 hops.

The rules engine 250 may determine that the second path is shorter than the first path. As the second path traverses 4 hops, if the hop index is 4 or less, then the server node 346 is designated a target CI associated with the target business service, and the rules engine 250 may direct the discovery job to proceed from the server node 346 to its direct successor nodes 362 and 370. In another example, if the hop index is 3 or less, then the rules engine 250 determines that a hop stop condition exists and stops the discovery job from proceeding from the server node 346 to its direct successor nodes. Additionally, the server node 346 may not be designated a target CI associated with the target business service. It will be appreciated that in other examples, a selected CI may have 3, 4, 5 or any suitable number of paths to a starting CI.

With reference again to FIG. 2, in some examples the rules engine 250 may comprise a border rule 258. With reference now to FIG. 3 and as described in more detail below, an example of border rule 258 will be described in the context of the directed graph 300.

In some examples, CIs of one business service in an IT infrastructure may communicate with CIs of another, different business service to consume information and/or services from those CIs. In this manner, different business services may have some level of dependency upon one another. In some examples, a border rule 258 may be utilized to recognize borders between different business services. In the example of FIG. 3, such a border is indicated by the target business service boundary 330. In this example, the CIs located outside of the target business service boundary 330 may be associated with another business service. For example, URL 308 may be associated with another business service.

As noted above, the edge between connected CIs in the directed graph 300 illustrates a relationship between these nodes of the IT infrastructure. In some examples, target CIs that are associated with the target business service may have a relationship with another CI that is not associated with the target business service. In one example and with reference to FIG. 3, the server node 338 may be a target CI, as indicated by its inclusion within the target business service boundary 330. In some examples, the server node 338 may have been discovered previously as a target CI by a prior discovery activity. The server node 338/target CI is upstream from, and a direct predecessor of, another server node 346 that also within, or internal to, the target business service boundary 330. Because the other server node 346 is internal to the target business service boundary 330, the edge 374 between server node 338/target CI and the other server node 346 may be marked as denoting an internal relationship.

In this example, the rules engine 250 may apply border rule 258 to the relationship denoted by edge 374 between the other server node 346 and the server node 338/target CI to determine if the relationship is internal or external. In this example, the rules engine 250 may determine that the edge 374 denotes an internal relationship. Accordingly, the discovery job may proceed from the server node 338/target CI to the other server node 346. In some examples, the other server node 346 may then be marked as a target CI. In other examples, the discovery job may apply another rule, such as hop rule 254, to the other server node 346 and/or perform other analysis of the other server node 346 to determine whether it is a target CI. In this manner, CIs with an internal relationship to a target CI may be determined to be target CIs that are associated with the target business service.

In another example, the server node 346 may be a target CI, as indicated by its inclusion within the target business service boundary 330. In some examples, the server node 346 may have been discovered previously as a target CI by a prior discovery activity. In this example the server node 346/target CI is upstream from, and a direct predecessor of, another server node 370 that is external to the target business service boundary 330. In some examples, the other server node 370 may be associated with another business service.

The rules engine 250 may apply border rule 258 to the relationship denoted by edge 380 between the other server node 370 and the server node 346/target CI to determine if the relationship is internal or external. As the other server node 370 lies outside of the target business service boundary 330, the rules engine 250 may determine that the relationship between the other server node 370 and the server node 346/target CI is external. In response, the rules engine 250 may determine that a border stop condition exists and may stop the discovery job from proceeding from the server node 346/target CI to the other server node 370. In some examples, the other server node 370 also may be disassociated from the target business service.

Accordingly, the system 10 discovers and marks CIs associated with the target business service while correspondingly avoiding the discovery of other CIs that are not associated with the target business service. In this manner, the time required to discover the target business service is reduced, and the resources required for such discovery are correspondingly minimized.

In some examples, a border rule 258 may be received via user input to, for example, the input/display module 214 of system 10. For example, an administrator may input a border rule 258 that comprises a type or characteristic of a relationship between CIs and, based on identifying such a type or characteristic in a relationship, designates the relationship as an internal or external relationship.

In some examples and for a variety of potential reasons, a target CI associated with a target business service may be removed from the business service's topology. In this situation, such removed target CI is disassociated from the target business service. Accordingly, and particularly with respect to discovery of business services, it may be desirable to also remove and disassociate other target CIs that are related to the disassociated target CI. In some examples, such other target CIs may comprise those CIs that were discovered by a discovery job that discovered the disassociated target CI.

In some examples and with reference to FIG. 2, the business service discovery engine 200 may receive a notification from a discovery job that a target CI that was associated with the target business service has been disassociated from the target business service. In one example and in response to receiving such a notification, the business service discovery engine 200 may identify a related target configuration item that is associated with the disassociated target configuration item, and may disassociate such related target configuration item from the target business service.

In one example and with reference to FIG. 3, the business service discovery engine 200 may receive a notification that an application node 354/target CI has been disassociated from the target business service. In response, the business service discovery engine 200 may identify that application node 354/target CI is related to server node 384/target CI as a direct predecessor of this other target CI. Based on this relationship, the business service discovery engine 200 may disassociate server node 384 from the target business service, wherein server node 384 is no longer a target CI associated with the target business service. In this manner, by removing those related target CI(s) that are associated with a disassociated target CI, the system 10 maintains an updated and accurate topology of the target business service.

In some examples, and as described in more detail below, in determining to disassociate server node 384 from the target business service, the business service discovery engine 200 may also determine that the server node 384 is not a direct successor of any other upstream target CIs that are associated with the target business service.

In some examples, in addition to being associated with a disassociated target CI, a target CI may be associated with another target CI that is separately associated with the target business service. In one example, the business service discovery engine 200 may receive a notification that an application node 386 has been disassociated from the target business service. In response, the business service discovery engine 200 may identify that application node 386 is related to server node 316/target CI as a direct predecessor of this other target CI. However, the business service discovery engine 200 may also identify that server node 316 is also a direct successor of another target CI, application node 312. Because server node 316/target CI is also a direct successor of another target CI (application node 312), the business service discovery engine 200 may refrain from disassociating server node 316/target CI from the target business service. In this manner, the system 10 maintains server node 316/target CI in the target business service topology, thereby recognizing the dependency of existing application node 312/target on server node 316/target CI.

By utilizing the system 10 and its associated configurations to focus discovery activities to the target business service, warnings and/or errors generated in such discovery activities may be received in context with the target business service. In other words, the system 10 of the present disclosure may generate discovery activity results that include information that associates such warnings and/or errors with the target business service or with another business service. Accordingly, a user or discovery administrator may be apprised of the specific business service that generated a particular warning or error during a discovery activity. Additionally and as noted above, the system 10 may significantly lower the time needed to discover and model a particular business service.

It will be appreciated that the examples shown in FIGS. 3 and 4 and described above are provided as examples, and that many variations are possible in the numbers of tiers, the arrangement of CIs, the dependencies between and among CIs, the types of CIs utilized, and the like.

With reference now to FIGS. 5A and 5B, a block diagram of a non-transitory machine-readable storage medium 500 containing instructions according to an example of the present disclosure is provided. In some examples and with reference also to FIG. 1, the non-transitory machine-readable storage medium may comprise instructions 30 for discovering target CIs associated with a target business service. When executed by at least one processor, such as processor 20 of the system 10, such instructions 30 may discover target CIs in a manner consistent with the following example and other examples described herein.

In the example of FIGS. 5A and 5B, and as described in more detail below, the instructions of non-transitory machine-readable storage medium 500 may include discovery job instructions to, at 504, initiate a discovery job to discover target CIs associated with a target business service in an information technology infrastructure comprising a plurality of CIs. The instructions may include scoping instructions to, at 508, for a first CI of the plurality of CIs, in response to a first stop condition not existing, designate the first CI as one of the target CIs and continue the discovery job from the first CI to a second CI of the plurality of CIs. The scoping instructions may, at 512, for the second CI of the plurality of CIs, in response to the first stop condition or a second stop condition existing, stop the discovery job from proceeding from the second CI to a third CI of the plurality of CIs.

The scoping instructions may, at 516, wherein the second stop condition is a hop stop condition, for the second CI: calculate a number of hops from the second CI to a starting CI of the plurality of CIs; and determine that the hop stop condition exists when the number of hops is greater than a hop index.

The discovery job instructions may, at 520, initiate another discovery job to discover the target CIs associated with the target business service. The scoping instructions may, at 524: determine a shortest path of a plurality of paths from a fourth CI to the starting CI, where the shortest path has a number of hops that is less than or equal to the hop index; and, in response, designate the fourth CI as one of the target CIs and continue the discovery job from the fourth CI to a fifth CI.

The scoping instructions may, at 528, receive the hop index via user input. The scoping instructions may, at 532, wherein a fourth CI is a direct successor of an upstream CI, and an edge between the upstream CI and the fourth CI represents a relationship: apply a border rule to the relationship between the fourth CI and the upstream CI to determine that the relationship is external and not internal; and in response, determine that a border stop condition exists and disassociate the fourth CI from the target business service. At 536, the fourth CI may be associated with another business service that is different from the target business service. The scoping instructions may, at 540, receive the border rule via user input.

With reference now to FIG. 5B, the scoping instructions may, at 544, receive a notification that one of the target CIs has been disassociated from the target business service; in response, identify a related target CI that is associated with the disassociated target CI; and disassociate the related target CI from the target business service. The scoping instructions may, at 548, identify the related target CI by determining that the related target CI is not a direct successor of an upstream target CI that is associated with the target business service.

Figure 6:
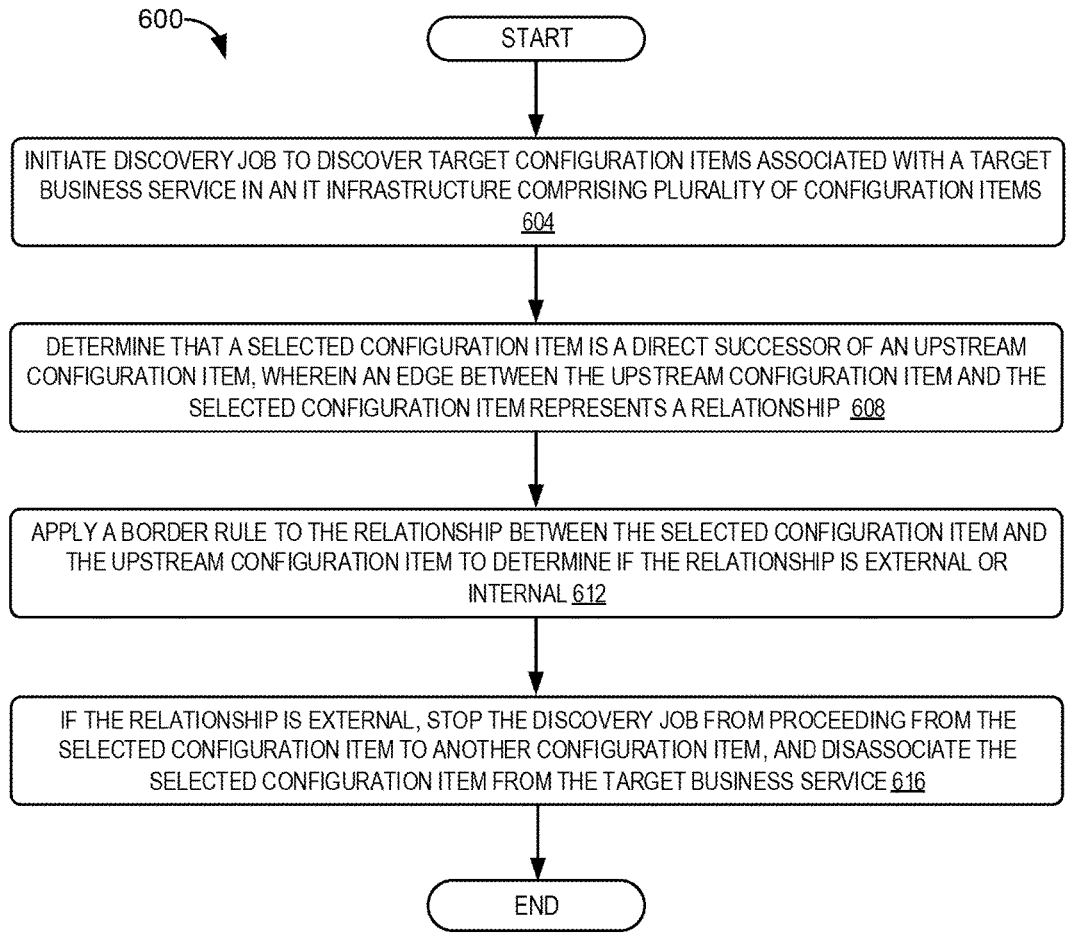
FIG. 6 is a flow chart of a method for discovering target configuration items associated with a target business service according to an example of the present disclosure.

Turning now to FIG. 6, a flow chart of a method 600 for discovering target CIs associated with a target business service according to another example of the present disclosure is provided. The following description of method 600 is provided with reference to the software and hardware components and example directed graph described above and shown in FIGS. 1-5. The method 600 may be executed in the form of instructions encoded on a non-transitory machine-readable storage medium that is executable by a processor. It will be appreciated that method 600 may also be performed in other contexts using other suitable hardware and software components.

With reference to FIG. 6, at 604 the method 600 may include initiating a discovery job to discover target CIs associated with a target business service in an information technology infrastructure comprising a plurality of CIs. At 608 the method 600 may include determining that a selected CI of the plurality of CIs is a direct successor of an upstream CI, wherein an edge between the upstream CI and the selected CI represents a relationship. At 612 the method 600 may include applying a border rule to the relationship between the selected CI and the upstream CI to determine if the relationship is external or internal. At 616 the method 600 may include, if the relationship is external, stopping the discovery job from proceeding from the selected CI to another CI, and disassociating the selected configuration item from the target business service.

It will be appreciated that method 600 is provided by way of example and is not meant to be limiting. Therefore, it is to be understood that method 600 may include additional and/or other elements than those illustrated in FIG. 6. Further, it is to be understood that method 600 may be performed in any suitable order. Further still, it is to be understood that at least one element may be omitted from method 600 without departing from the scope of this disclosure.

The invention claimed is:

1. A non-transitory machine-readable storage medium encoded with instructions executable by a processor, the storage medium comprising instructions executable to:
   initiate a discovery job in a directed graph stored in a configuration management database (CMDB) to discover configuration items associated with a target business service in an information technology infrastructure comprising a plurality of configuration items, the discovery job to apply one or more rules and corresponding stop conditions to determine whether discovered configuration items are associated with the target business service, wherein the directed graph is stored in the CMDB prior to initiation of the discovery job, the directed graph including the plurality of configuration items;
   identify, by the discovery job in the CMDB, a first configuration item in the directed graph that is associated with the target business service in response to a first stop condition not existing;
   identify, by the discovery job in the CMDB, a second configuration item in the directed graph that is a direct successor of the first configuration item after the identification of the first configuration item that is associated to the target business service;
   after the identification of the second configuration item, determine, by the discovery job in the CMDB, whether the directed graph indicates that the second configuration item is internal to a boundary of the target business service associated with the first configuration item; and
   in response to a determination that the directed graph does not indicate that the second configuration item is internal to the boundary of the target business service:
      stop the discovery job from proceeding from the second configuration item to a third configuration item in the directed graph, and
      disassociate the second configuration item from the target business service.

2. The non-transitory machine-readable storage medium of claim 1, the instructions executable to:
   for the second configuration item:
      calculate a number of hops from the second configuration item to a starting configuration item of the plurality of configuration items; and
      compare the number of hops to a hop index.

3. The non-transitory machine-readable storage medium of claim 2:
   the instructions executable to:
      determine a shortest path of a plurality of paths from the second configuration item to the starting configuration item; and
      in response to a determination that the shortest path has a number of hops that is less than or equal to the hop index, designate the second configuration item as being internal to the boundary of the target business service.

4. The non-transitory machine-readable storage medium of claim 3, the instructions executable to:
in response to a determination that the second configuration item is internal to the boundary of the target business service:
associate the second configuration item with the target business service; and
continue the discovery job from the second configuration item to another configuration item.

5. The non-transitory machine-readable storage medium of claim 2, the instructions executable to receive the hop index via user input.

6. The non-transitory machine-readable storage medium of claim 1, wherein the second configuration item is associated with another business service that is different from the target business service.

7. The non-transitory machine-readable storage medium of claim 1, the instructions executable to:
receive a border rule via user input; and
use the border rule to determine whether the directed graph indicates that the second configuration item is internal to the boundary of the target business service.

8. The non-transitory machine-readable storage medium of claim 1, the instructions executable to:
receive a notification that a fourth configuration item has been disassociated from the target business service;
in response to the notification:
identify a related configuration item that is associated with the disassociated fourth configuration item; and
disassociate the related configuration item from the target business service.

9. The non-transitory machine-readable storage medium of claim 8, the instructions executable to identify the related configuration item by determining that the related configuration item is not a direct successor of an upstream configuration item that is associated with the target business service.

10. A system, comprising:
a storage to store a configuration management database (CMDB) comprising a directed graph, the directed graph including a plurality of configuration items that comprise an information technology infrastructure; and
a processor to:
initiate a discovery job in the directed graph stored in the CMDB to discover configuration items associated with a target business service among a plurality of business services in the information technology infrastructure, the discovery job to apply one or more rules and corresponding stop conditions to determine whether discovered configuration items are associated with the target business service, wherein the directed graph is stored in the CMDB prior to initiation of the discovery job;
identify, by the discovery job in the CMDB, a first configuration item in the directed graph that is associated with the target business service in response to a first stop condition not existing;
identify, by the discovery job in the CMDB, a second configuration item of the plurality of configuration items that is a direct successor of the first configuration item after the identification of the first configuration item that is associated to the target business service;
after the identification of the second configuration item, determine, by the discovery job in the CMDB, whether the directed graph indicates that the second configuration item is internal to a boundary of the target business service associated with the first configuration item; and
in response to a determination that the directed graph does not indicate that the second configuration item is internal to the boundary of the target business service:
stop the discovery job from proceeding from the second configuration item to a third configuration item in the directed graph, and
disassociate the second configuration item from the target business service.

11. The system of claim 10, the processor to:
determine a shortest path of a plurality of paths from the second configuration item to a starting configuration item; and
in response to a determination that the shortest path has a number of hops that is less than or equal to the hop index, designate the second configuration item as being internal to the boundary of the target business service, continue the discovery job from the second configuration item to the third configuration item.

12. The system of claim 10, the processor to:
in response to a determination that the second configuration item is internal to the boundary of the target business service:
associate the second configuration item with the target business service; and
continue the discovery job from the second configuration item to another configuration item.

13. The system of claim 12, the processor to:
receive a notification that the second configuration item has been disassociated from the target business service;
in response to the notification:
identify a related configuration item that is associated with the disassociated second configuration item; and
disassociate the related configuration item from the target business service.

14. The system of claim 10, the processor to:
receive a border rule via user input; and
use the border rule to determine whether the directed graph indicates that the second configuration item is internal to the boundary of the target business service.

15. A method, comprising:
initiating a discovery job in a directed graph stored in a configuration management database (CMDB) to discover configuration items associated with a target business service in an information technology infrastructure comprising a plurality of configuration items, the discovery job to apply one or more rules and corresponding stop conditions to determine whether discovered configuration items are associated with the target business service, wherein the directed graph is stored in the CMDB prior to initiation of the discovery job, the directed graph including the plurality of configuration items;
identifying, by the discovery job in the CMDB, a first configuration item in the directed graph that is associated with the target business service in response to a first stop condition not existing;
identify, by the discovery job in the CMDB, a second configuration item in the directed graph that is a direct successor of the first configuration item after the identification of the first configuration item that is associated to the target business service;

after the identification of the second configuration item, determining, by the discovery job in the CMDB, whether the directed graph indicates that the second configuration item is internal to a boundary of the target business service associated with the first configuration item; and in response to a determination that the directed graph does not indicate that the second configuration item is internal to the boundary of the target business service:

stopping the discovery job from proceeding from the selected configuration item to another configuration item, and disassociating the selected configuration item from the target business service.

16. The method of claim 15, comprising:

in response to a determination that the second configuration item is internal to the boundary of the target business service:

associating the second configuration item with the target business service; and continuing the discovery job from the second configuration item to another configuration item.

17. The method of claim 16, comprising, after associating the second configuration item with the target business service:

receiving a notification that the second configuration item has been disassociated from the target business service;

in response to the notification:

identifying a related configuration item that is associated with the disassociated second configuration item; and disassociating the related configuration item from the target business service.

18. The method of claim 15, comprising:

receiving a border rule via a user input; and determining, using the border rule, whether the directed graph indicates that the second configuration item is internal to the boundary of the target business service.

19. The method of claim 15, comprising:

determining a shortest path of a plurality of paths from the second configuration item to a starting configuration item; and in response to a determination that the shortest path has a number of hops that is greater than the hop index, designating the second configuration item as not being internal to the boundary of the target business service.

20. The method of claim 19, wherein the second configuration item is associated with another business service that is different from the target business service.

* * * * *